United States Patent
Andrasko et al.

(10) Patent No.: US 9,381,904 B2
(45) Date of Patent: Jul. 5, 2016

(54) SYSTEM FOR CONTROLLING VEHICLE OVERSPEEDING VIA CONTROL OF ONE OR MORE EXHAUST BRAKE DEVICES

(71) Applicant: Allison Transmission, Inc., One Allison Way, IN (US)

(72) Inventors: Steven Andrasko, Wixom, MI (US); John Kresse, Martinsville, IN (US); Kevin Kluemper, Monrovia, IN (US); Brett Caldwell, New Palestine, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/267,271

(22) Filed: May 1, 2014

(65) Prior Publication Data
US 2014/0244116 A1    Aug. 28, 2014

Related U.S. Application Data

(63) Continuation of application No. 12/579,952, filed on Oct. 15, 2009, now Pat. No. 8,738,248.

(60) Provisional application No. 61/107,102, filed on Oct. 21, 2008.

(51) Int. Cl.
*G06F 7/00* (2006.01)
*B60W 10/198* (2012.01)
(Continued)

(52) U.S. Cl.
CPC .............. *B60W 10/198* (2013.01); *B60W 10/06* (2013.01); *B60W 30/143* (2013.01); *B60W 30/18136* (2013.01); *F02D 9/06* (2013.01); *B60T 2230/00* (2013.01); *B60W 2510/0638* (2013.01); *B60W 2510/18* (2013.01); *B60W 2550/12* (2013.01); *B60W 2710/0666* (2013.01); *B60W 2720/10* (2013.01); *F02B 37/22* (2013.01); *F02D 41/0007* (2013.01); *F02D 41/021* (2013.01); *F02D 2200/501* (2013.01); *Y10T 477/60* (2015.01)

(58) Field of Classification Search
CPC . B60W 10/198; B60W 10/06; B60W 30/143; B60W 30/18136
USPC ........................................................ 701/48
See application file for complete search history.

(56) References Cited

U.S. PATENT DOCUMENTS 5,646,849 A * 7/1997 Walenty ................ B60T 8/1764
                                                          303/155
6,267,454 B1 * 7/2001 Takahashi ............... B60T 7/042
                                                          303/186
(Continued)

OTHER PUBLICATIONS

NPL: Engine Braking Date:N/A.*

*Primary Examiner* — Ian Jen
(74) *Attorney, Agent, or Firm* — Barnes & Thornburg LLP

(57) ABSTRACT

A method and system are provided for controlling overspeeding of a vehicle carrying an internal combustion engine having one or more exhaust brake devices controllable to apply braking torque to the engine. The system may be operable determine a desired speed of the vehicle, to determine a road speed of the vehicle, and if the road speed of the vehicle exceeds the desired speed of the vehicle by more than a threshold speed, to determine a target brake torque required to reduce the road speed of the vehicle speed to the desired speed of the vehicle, and to then control the one or more exhaust brake devices to apply the target brake torque to the engine to thereby control the road speed of the vehicle to the desired speed of the vehicle.

20 Claims, 4 Drawing Sheets

(51) Int. Cl.
   *B60W 30/14*   (2006.01)
   *B60W 30/18*   (2012.01)
   *F02D 9/06*    (2006.01)
   *B60W 10/06*   (2006.01)
   *F02B 37/22*       (2006.01)
   *F02D 41/00*       (2006.01)
   *F02D 41/02*       (2006.01)

(56) References Cited

U.S. PATENT DOCUMENTS

| | | | | |
|---|---|---|---|---|
| 6,278,926 B1 * | 8/2001 | Jain | ............... | F16H 61/061 |
| | | | | 192/3.25 |
| 6,280,003 B1 * | 8/2001 | Oshiro | ............... | B60T 8/1766 |
| | | | | 303/140 |
| 6,311,117 B1 * | 10/2001 | Winner | ............... | B60K 31/0008 |
| | | | | 180/170 |
| 6,374,174 B2 * | 4/2002 | Hellmann | ............... | 701/93 |
| 6,385,527 B1 * | 5/2002 | Zumberge | ............... | B60K 28/16 |
| | | | | 701/78 |
| 6,443,540 B2 * | 9/2002 | Shimizu | ............... | 303/116.2 |
| 7,130,733 B2 * | 10/2006 | Mussaeus | ............... | F16H 61/0437 |
| | | | | 701/51 |
| 7,172,043 B2 * | 2/2007 | Iwaki | ............... | B60K 31/045 |
| | | | | 180/170 |
| 7,200,481 B2 * | 4/2007 | Yamamura | ............... | G08G 1/166 |
| | | | | 180/171 |
| 7,308,961 B2 * | 12/2007 | Satou | ............... | B60K 31/04 |
| | | | | 180/170 |
| 7,566,103 B2 * | 7/2009 | Wanner | ............... | B60W 10/06 |
| | | | | 303/155 |
| 7,593,801 B2 * | 9/2009 | Lock | ............... | B60K 31/04 |
| | | | | 180/170 |
| 7,860,631 B2 * | 12/2010 | Williams | ............... | F16H 61/42 |
| | | | | 192/3.31 |
| 7,914,085 B2 * | 3/2011 | Tsunehara | ............... | B60T 8/173 |
| | | | | 303/139 |
| 7,917,272 B2 * | 3/2011 | Suzuki | ............... | B60K 31/0066 |
| | | | | 123/349 |
| 8,751,109 B2 * | 6/2014 | Watanabe | ............... | B60T 8/1755 |
| | | | | 303/191 |
| 8,948,953 B2 * | 2/2015 | Inoue | ............... | B60T 7/12 |
| | | | | 701/23 |
| 2002/0152015 A1 * | 10/2002 | Seto | ............... | B60K 31/0008 |
| | | | | 701/96 |
| 2005/0055151 A1 * | 3/2005 | Kustosch | ............... | B60K 31/04 |
| | | | | 701/93 |
| 2005/0065704 A1 * | 3/2005 | Glora | ............... | B60K 31/04 |
| | | | | 701/93 |
| 2010/0168973 A1 * | 7/2010 | Kluemper | ............... | F16H 61/143 |
| | | | | 701/67 |
| 2010/0305822 A1 * | 12/2010 | Kresse | ............... | F16H 61/0213 |
| | | | | 701/56 |
| 2011/0054749 A1 * | 3/2011 | Merrion | ............... | F16H 59/72 |
| | | | | 701/58 |

\* cited by examiner

SYSTEM FOR CONTROLLING VEHICLE OVERSPEEDING VIA CONTROL OF ONE OR MORE EXHAUST BRAKE DEVICES

CROSS REFERENCE TO RELATED APPLICATIONS

This application claims priority to and is a continuation application of U.S. application Ser. No. 12/579,952, entitled "SYSTEM FOR CONTROLLING VEHICLE OVERSPEEDING VIA CONTROL OF ONE OR MORE EXHAUST BRAKE DEVICES," which was filed on Oct. 15, 2009, and which claims the benefit of U.S. Provisional Application No. 61/107,102, filed Oct. 21, 2008. The entirety of each of those applications is incorporated herein by reference.

FIELD OF THE INVENTION

The present invention relates generally to systems having one or more exhaust brake devices, and more specifically to systems for controlling vehicle overspeed conditions by controlling one or more exhaust brake devices.

BACKGROUND

Vehicle exhaust brake devices are generally known, and examples include, but are not limited to, variable geometry turbochargers, exhaust throttle devices, and the like. It is desirable to control vehicle overspeed conditions via control of one or more such exhaust brake devices.

SUMMARY

The present invention may comprise one or more of the features recited in the attached claims, and/or one or more of the following features and combinations thereof. A method is provided for controlling overspeeding of a vehicle carrying an internal combustion engine having one or more exhaust brake devices controllable to apply braking torque to the engine. The method may comprise determining a desired speed of the vehicle, determining a road speed of the vehicle, and if the road speed of the vehicle exceeds the desired speed of the vehicle by more than a threshold speed, determining a target brake torque required to reduce the road speed of the vehicle speed to the desired speed of the vehicle, and controlling the one or more exhaust brake devices to apply the target brake torque to the engine to thereby control the road speed of the vehicle to the desired speed of the vehicle.

In one embodiment, determining a desired speed of the vehicle may comprise determining set speed of a cruise control system of the vehicle. Alternatively or additionally, determining a desired speed of the vehicle may comprise monitoring the road speed of the vehicle, monitoring operation of a service brake of the vehicle, determining vehicle acceleration from the monitored road speed of the vehicle, and determining the desired speed of the vehicle over a time period based on vehicle acceleration over the time period and on a duration of the time period in which the service brake of the vehicle was depressed.

In one embodiment, determining a target brake torque required to reduce the road speed of the vehicle to the desired speed of the vehicle may comprise mapping the road speed of the vehicle and the desired speed of the vehicle to the target brake torque using a map that defines target brake torque values as functions of pairs of values of the road speed and the desired speed of the vehicle. Alternatively or additionally, determining a target brake torque required to reduce the road speed of the vehicle to the desired speed of the vehicle may comprise determining a speed error as a difference between the road speed of the vehicle and the desired speed of the vehicle, and determining the target brake value based on the speed error. Determining the target brake value based on the speed error may comprise controlling the speed error to the target brake value using a controller. Illustratively, determining the target brake value based on the speed error may comprise controlling the speed error to the target brake value using a proportional-integral controller.

Controlling the one or more exhaust brake devices may comprise determining a control setting of at least one of the one or more exhaust brake devices based on the target brake torque, and controlling the at least one of the one or more exhaust brake devices to the control setting. The method may further comprise determining a rotational speed of the engine, and determining a current barometric pressure. Determining a control setting of at least one of the one or more exhaust brake devices may then comprise determining the control setting of the at least one of the one or more exhaust brake devices further based on the rotational speed of the engine and on the current barometric pressure. In one embodiment, determining a control setting of at least one of the one or more exhaust brake devices may comprise determining a target vane position of a variable geometry turbocharger fluidly coupled to the engine based on the target brake torque, the rotational speed of the engine and the current barometric pressure. Controlling the at least one of the one or more exhaust brake devices to the control setting may then comprise controlling vanes of the variable geometry turbocharger to the target vane position. Alternatively or additionally, determining a control setting of at least one of the one or more exhaust brake devices may comprise determining a target position of an exhaust throttle based on the target brake torque, the rotational speed of the engine and the current barometric pressure. Controlling the at least one of the one or more exhaust brake devices to the control setting may then comprise controlling the exhaust throttle to the target position.

The method may further comprise determining a maximum available brake torque corresponding to a maximum available brake torque that may be currently applied to the engine, and determining the target brake torque as a minimum of the target brake torque and the maximum available brake torque value.

A system for controlling overspeeding of a vehicle carrying an internal combustion engine may comprise a first speed sensor configured to produce a speed signal indicative of road speed of the vehicle, an exhaust brake device responsive to a control signal to apply braking torque to the engine, a first control circuit including a memory having instructions stored therein that are executable by the first control circuit to determine a desired speed of the vehicle, and if the road speed of the vehicle exceeds the desired speed of the vehicle by more than a threshold speed to determine a target brake torque required to reduce the road speed of the vehicle speed to the desired speed of the vehicle, and a second control circuit configured to control operation of the engine, the second control circuit including a memory having instructions stored therein that are executable by the second control circuit to produce the control signal based on the target brake torque to thereby control the road speed of the vehicle to the desired speed of the vehicle.

The system may further comprise a datalink connected between the first and second control circuits. The instructions stored in the memory of the second control circuit may further include instructions that are executable by the second control circuit to send to the first control circuit via the datalink a maximum available brake torque corresponding to a maximum available brake torque that may be currently applied to the engine. The instructions stored in the memory of the first control circuit may further include instructions that are executable by the first control circuit to determine the target brake torque as a minimum of the target brake torque and the maximum available brake torque value.

The instructions stored in the memory of the first control circuit may include instructions that are executable by the first control circuit to send the target brake torque to the second control circuit via the datalink. The instructions stored in the memory of the second control circuit may further include instructions that are executable by the second control circuit to send to the first control circuit via the datalink a maximum available brake torque corresponding to a maximum available brake torque that may be currently applied to the engine. The instructions stored in the memory of the first control circuit may further include instructions that are executable by the first control circuit to determine the target brake torque as a minimum of the target brake torque and the maximum available brake torque value.

The system may further comprise an engine speed sensor configured to produce an engine speed signal indicative of rotational speed of the engine, and a barometric pressure sensor configured to produce a pressure signal indicative of current barometric pressure. The instructions stored in the memory of the second control circuit may include instructions that are executable by the second control circuit to produce the control signal further based on the engine speed signal and on the pressure signal. In on embodiment, the exhaust brake device may comprises a variable geometry turbocharger having a number of positionable vanes, and the instructions stored in the memory of the second control circuit may include instructions that are executable by the second control circuit to produce the control signal in the form of a target vane position to thereby control the vanes of the variable geometry turbocharger to the target vane position. Alternatively or additionally, the exhaust brake device may comprise an exhaust throttle configured to restrict exhaust gas flow therethrough, and the instructions stored in the memory of the second control circuit may include instructions that are executable by the second control circuit to produce the control signal in the form of a target exhaust throttle position to thereby control the exhaust throttle to the target vane exhaust throttle position.

The instructions stored in the memory of the second control circuit may further include instructions that are executable by the second control circuit to send to the first control circuit via the datalink a maximum available brake torque corresponding to a maximum available brake torque that may be currently applied to the engine. The instructions stored in the memory of the first control circuit may further include instructions that are executable by the first control circuit to determine the target brake torque as a minimum of the target brake torque and the maximum available brake torque value.

The system may further comprise a second speed sensor configured to produce a speed signal indicative of rotational speed of an input shaft of a transmission, and means for determining a current barometric pressure. The instructions stored in the memory of the first control circuit may include instructions that are executable by the first control circuit to determine a control setting of the engine brake device based on the target brake torque, the speed signal produced by the second sensor and the current barometric pressure, and to send the control setting to the second control circuit. The instructions stored in the memory of the second control circuit may include instructions that are executable by the second control circuit to produce the control signal based on the control setting received from the first control circuit. In one embodiment, the exhaust brake device may comprise a variable geometry turbocharger having a number of positionable vanes. In one embodiment, the instructions stored in the memory of the first control circuit may include instructions that are executable by the first control circuit to determine the control setting in the form of a target vane position to thereby control the vanes of the variable geometry turbocharger to the target vane position. Alternatively or additionally, the exhaust brake device may comprise an exhaust throttle configured to restrict exhaust gas flow therethrough. The instructions stored in the memory of the first control circuit may include instructions that are executable by the first control circuit to produce the control setting in the form of a target exhaust throttle position to thereby control the exhaust throttle to the target exhaust throttle position.

The system may further comprise a datalink connected between the first and second control circuits, and a cruise control system electrically connected to the second control circuit, the cruise control system configured to produce a set speed for setting the road speed of the vehicle. The instructions stored in the memory of the second control circuit may further include instructions that are executable by the second control circuit to send to the first control circuit via the datalink the desired vehicle speed in the form of the set speed of the cruise control system.

The vehicle may comprise a service brake and a service brake switch configured to produce a service brake signal corresponding to an operational state of the service brake. The instructions stored in the memory of the first control circuit may include instructions that are executable by the first control circuit to determine vehicle acceleration from the speed signal produced by the first speed sensor, and to learn the desired speed of the vehicle over a time period based on vehicle acceleration over the time period and on a duration of the time period in which the service brake of the vehicle was depressed.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
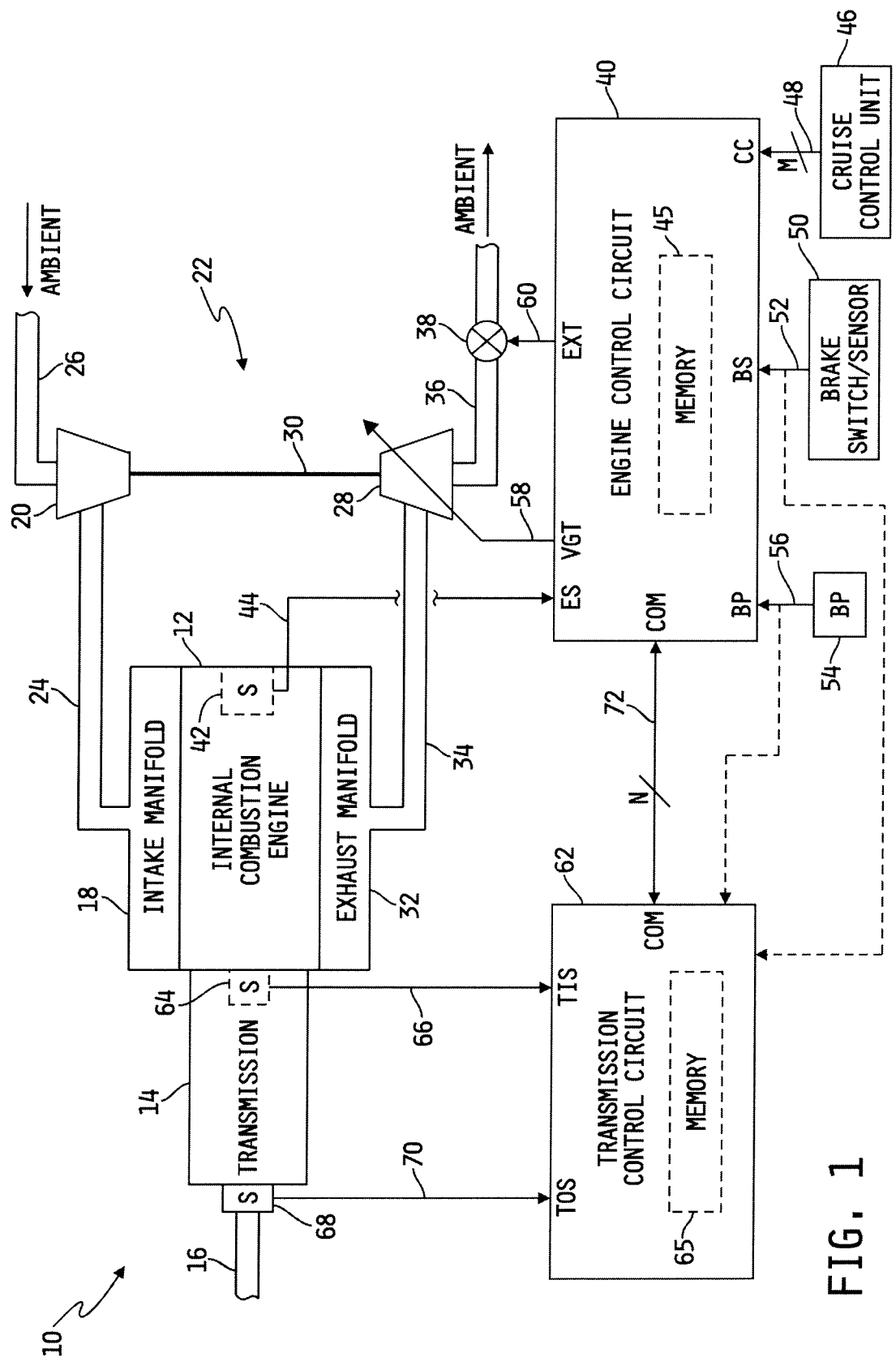
FIG. 1 is a diagram of one illustrative embodiment of a system for controlling vehicle overspeed conditions via control of one or more exhaust brake devices.

Referring now to FIG. 1, a block diagram and schematic view is shown of one illustrative embodiment of a system 10 for controlling vehicle overspeed conditions via control of one or more exhaust brake devices. In the illustrated embodiment, the system 10 includes an internal combustion engine 12 that is configured to rotatably drive an output shaft (not shown) that is coupled to an input shaft (not shown) of a conventional transmission 14. A rotatable output shaft 16 extends from the transmission 14 and is coupled via a conventional differential assembly (not shown) to a rotatable axle that drives one or more wheels of a vehicle carrying the engine 12 and transmission 14. The transmission 14 is conventional and illustratively includes a number of automatically selected gear ratios, although embodiments are contemplated in which the transmission 14 includes one or more manually selectable gear ratios.

The engine 12 includes an air intake manifold 18 that is fluidly coupled to an air outlet of a compressor 20 of a conventional turbocharger 22 via an air intake conduit 24. An air inlet of the compressor 20 is fluidly coupled via a conduit 26 to ambient. The turbocharger 22 further includes a turbine 28 that is rotatably coupled to the compressor 20 via a rotatably shaft 30, and an exhaust gas inlet of the turbine 28 is fluidly coupled to an exhaust manifold 32 of the engine 12 via an exhaust gas conduit 34. An exhaust gas outlet of the turbine 28 is fluidly coupled to ambient via an exhaust gas conduit 36. In the illustrated embodiment, the turbocharger 22 is a variable geometry turbocharger, meaning that the exhaust gas flow volume through the turbine 28 is selectively variable. In one embodiment, for example, the turbine 28 includes a number of conventional vanes that may be selectively positioned by a suitable actuator to thereby control the exhaust gas flow volume through the turbine 28. Alternatively, the turbine 28 may include other conventional geometry-varying structures for controlling the flow volume of exhaust gas through the turbine 28. In any case, the variable geometry turbocharger 22 is controllable to decrease, i.e., restrict, exhaust gas flow through the exhaust gas conduits 34 and 36, and/or to increase exhaust gas flow through the exhaust gas conduits 34 and 36. The control mechanism for accomplishing this is illustrated in FIG. 1 by the diagonal arrow extending through the turbine 28.

In the illustrated embodiment, a conventional exhaust throttle 38 is positioned between the exhaust gas outlet of the turbine 28 and ambient. The exhaust throttle 28 illustratively includes a valve or plate having a position relative to the exhaust throttle 28 that is controllable via a conventional actuator to restrict or increase exhaust gas flow through the throttle 28. Alternatively or additionally, the exhaust throttle 38 may be substituted or augmented by a similar throttle interposed in the air intake conduit 24 between the compressor 20 of the turbocharger 22 and the air intake manifold 18.

As they relate to the present disclosure, the variable geometry turbocharger 22 and the exhaust throttle 28 may be separately or together controlled to selectively restrict exhaust gas flow therethrough. Restricting air flow through the engine 12 generally, and restricting exhaust gas flow through the exhaust gas conduits 34 and 36 specifically, imparts a retarding force on the engine 12 as is known in the art. This retarding force results in a decrease in the rotational speed of the engine 12 which, applied through the drivetrain comprising the transmission 14, output shaft 16, differential and drive axle, causes the road speed of the vehicle to likewise decrease. The variable geometry turbocharger 22 and the exhaust throttle 38 are referred to herein as exhaust brake devices.

The system 10 further includes an engine control circuit 40 that includes a memory unit 45. The engine control circuit 40 is illustratively microprocessor-based, and the memory unit 45 generally includes instructions stored therein that are executable by the engine control circuit 40 to control operation of the engine 12, operation of the variable geometry turbocharger 22 and operation of the exhaust throttle 38. It will be understood, however, that this disclosure contemplates other embodiments in which the engine control circuit 40 is not microprocessor-based, but is configured to control operation of the engine 12, the variable geometry turbocharger 22 and the exhaust throttle 38 based on one or more sets of hardwired instructions and/or software instructions stored in the memory unit 45.

In the system 10 illustrated in FIG. 1, a number of sensors, systems and actuators are electrically connected to the engine control circuit 40. For example, an engine speed sensor 42 is electrically connected to an engine speed input, ES, of the engine control circuit 40 via a signal path 44. The engine speed sensor 42 is a conventional sensor, such as a Hall-effect or other known sensor, and is configured to produce a speed signal corresponding to rotational speed of the engine 12. The system 10 further includes a conventional cruise control system 46 that is electrically connected to a cruise control input port, CC, of the engine control circuit 40 via a number, M, of signal paths 48, wherein M may be any positive integer. The cruise control system 46 is operable in a conventional manner to supply signals to the engine control circuit 40, based on manual input by the driver, corresponding to a desired road speed, e.g., "set" speed, of the vehicle. When a desired road speed has been selected by the driver, the cruise control unit 46 supplies corresponding signals to the engine control circuit 40, and the engine control circuit 40 is responsive to these signals to control, pursuant to instructions stored in the memory unit 45, fueling and other operating parameters of the engine 12 in a conventional manner so that the road speed of the vehicle carrying the engine 12 is maintained at the desired road speed value.

The system 10 further includes a conventional service brake switch or sensor 50 that is electrically connected to a brake sensor input, BS, of the engine control circuit 40 via a signal path 52. The service brake switch or sensor 50 produces a signal that corresponds to depression by the driver of the service brake of the vehicle. The system 10 further includes a barometric or ambient pressure sensor 54 that is electrically connected to a barometric pressure input, BP, of the engine control circuit 40 via a signal path 56. The barometric pressure sensor 54 may be conventional, and is operable to produce a pressure signal that corresponds to ambient or barometric pressure.

The system 10 further includes one or more exhaust brake devices, as this term has been defined herein. In the illustrated embodiment, for example, a variable geometry turbocharger output, VGT, of the engine control circuit 40 is electrically connected by a signal path 58 to an actuator (represented by the diagonal arrow through the turbine 28 in FIG. 1) that controls the flow volume of exhaust gas through the turbine 28, e.g., by controlling the position of one or more turbine flow geometry-determining turbine vanes. In the embodiment illustrated in FIG. 1, an exhaust throttle output, EXT, of the engine control circuit 40 is electrically connected to the exhaust throttle 38 via a signal path 60. The engine control circuit 40 is thus operable, pursuant to instructions stored in the memory unit 45, to control operation of the turbine 28 and of the exhaust throttle 38. It should be understood, however, that other embodiments are contemplated in which the system includes only one of the exhaust brake devices.

The system 10 further includes a transmission control circuit 62 that includes a memory unit 65. The transmission control circuit 62 is illustratively microprocessor-based, and the memory unit 65 generally includes instructions stored therein that are executable by the transmission control circuit 62 to control operation of the transmission 14. It will be understood, however, that this disclosure contemplates other embodiments in which the transmission control circuit 62 is not microprocessor-based, but is configured to control operation of the transmission 14 based on one or more sets of hardwired instructions and/or software instructions stored in the memory unit 65.

In the system 10 illustrated in FIG. 1, the transmission 14 includes a number of sensors configured to produce sensor signals that are indicative of one or more operating states of the transmission 14. For example, an input shaft speed sensor 64 is positioned and configured to produce a speed signal corresponding to the rotational speed of the transmission input shaft (which is also the rotational speed of the output shaft of the engine 12). The speed sensor 64 may be conventional and is electrically connected to a transmission input speed input, TIS, of the transmission control circuit 64 via a signal path 66, and the transmission control circuit 62 is operable to process the speed signal produced by the speed sensor 64 in a conventional manner to determine the rotational speed of the transmission input shaft. The transmission 14 further includes another speed sensor 68 that is positioned and configured to produce a speed signal corresponding to the rotational speed of the output shaft of the transmission 14. The speed sensor 68 may be conventional and is electrically connected to a transmission output speed input, TOS, of the transmission control circuit 62 via a signal path 70, and the transmission control circuit 62 is operable to process the speed signal produced by the speed sensor 68 in a conventional manner to determine the road speed of the vehicle carrying the engine 12 and the transmission 14.

The engine control circuit 40 and the transmission control circuit 62 each further includes a communication port, COM, and the two communication ports, COM, are electrically connected together via a number, N, of signal paths 72, wherein N may be any positive integer. The one or more signal paths 72 are typically referred to as a data link. Generally, the engine control circuit 40 and the transmission control circuit 62 are operable to share information via the data link 72 in a conventional manner. In one embodiment, for example, the engine control circuit 40 and transmission control circuit 462 are operable to share information via the data link 72 in the form of messages in accordance with a society of automotive engineers (SAE) J-1939 communications protocol, although this disclosure contemplates other embodiments in which the engine control circuit 40 and the transmission control circuit 62 are operable to share information via the data link 72 in accordance with one or more other conventional communication protocols.

As it relates to this disclosure, the transmission control circuit 62 is operable to receive certain operating information relating to operation of the engine 12 from the engine control circuit 40 via the data link 72 in a conventional manner. For example, the engine control circuit 40 is configured in a conventional manner to continually send to the transmission control circuit 62 via the data link 72 the "set" speed of the cruise control unit 46, i.e., the desired road speed produced by the cruise control unit 46, the status of the brake switch or current brake sensor signal produced by the brake switch or sensor 50 and the current barometric pressure signal produced by the barometric pressure sensor 54. Alternatively or additionally, the brake switch or sensor signal and the barometric pressure signal may be provided directly by the brake sensor/switch 50 and pressure sensor 54 respectively to the transmission control circuit 62 as shown by dashed-line representation in FIG. 1.

Figure 2:
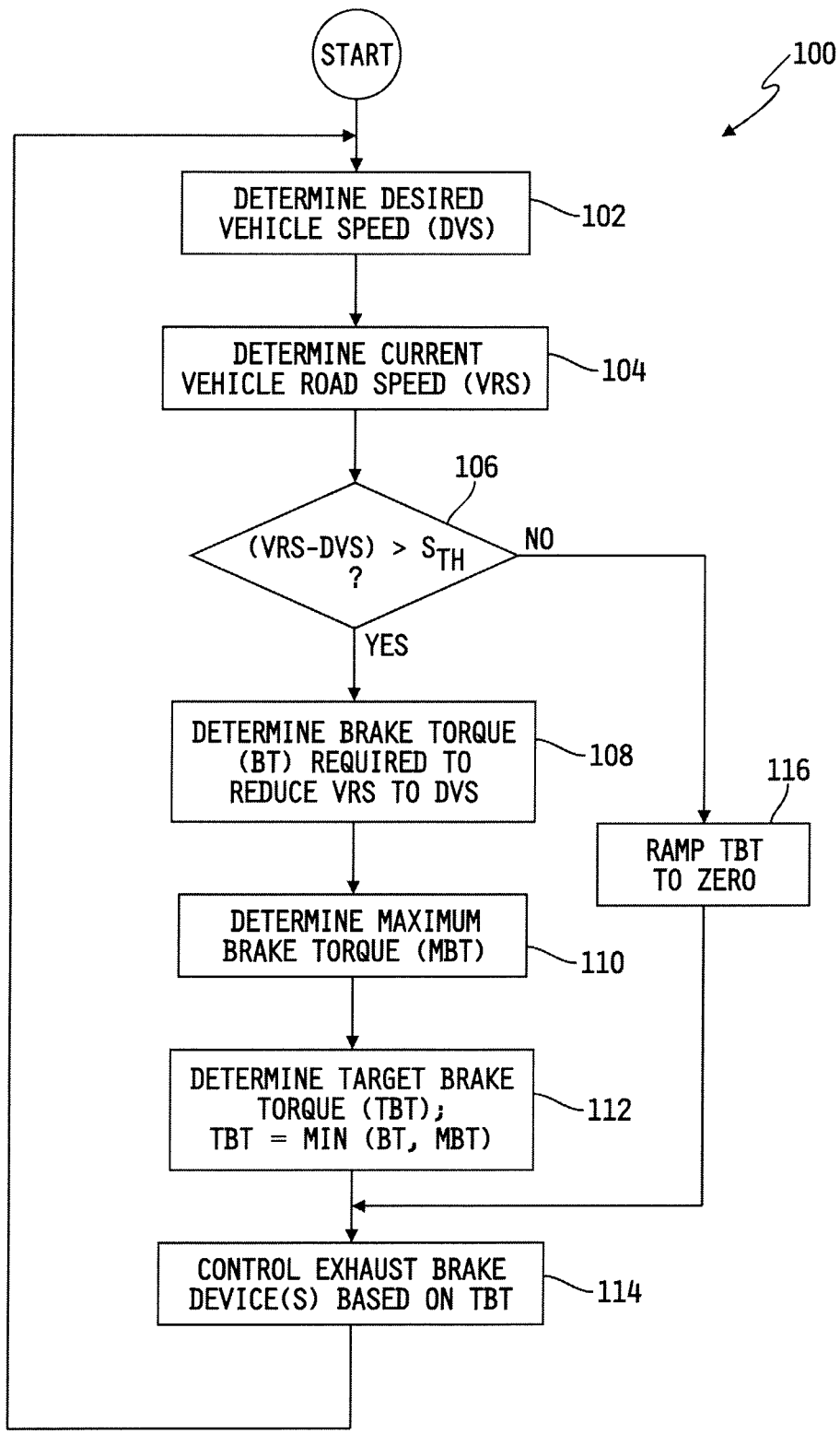
FIG. 2 is a flowchart of one illustrative embodiment of a process for controlling vehicle overspeed conditions via control of one or more exhaust brake devices.

Referring now to FIG. 2, a flowchart is shown of one illustrative embodiment of a process 100 for controlling vehicle overspeed conditions via control of one or more exhaust brake devices. In the illustrated embodiment, the process 100 is stored in the memory unit 65 of the transmission control circuit 62 in the form of instructions that are executable by the transmission control circuit 62. Alternatively, parts of the process 100 may be stored in the memory unit 65 of the transmission control circuit 62 in the form of instructions that are executable by the transmission control circuit 62 and other parts may be stored in the memory unit 45 of the engine control circuit 40 in the form of instructions that are executable by the engine control circuit 40.

The process 100 begins at step 102 where the transmission control circuit 62 is operable to determine the desired vehicle speed, DVS. In circumstances in which the cruise control unit 46 is active and producing a desired or "set" speed signal, the engine control circuit 40 is operable to continually send this desired speed value to the transmission control circuit 62 via the data link 72, e.g., in the form of one or more broadcast messages. In circumstances in which the cruise control unit 46 is not active or is otherwise not produced the desired or "set" speed signal, the transmission control circuit 62 is operable to determine the desired road speed based on information from other sensors, switches and/or systems. In one embodiment, for example, the transmission control circuit 62 is operable to continually monitor the current road speed of the vehicle by monitoring the signal produced by the transmission output shaft speed sensor 68, and to continually monitor the status of, or signal produced by, the service brake switch or sensor 50 and to process these signals to determine the desired road speed as a function of vehicle acceleration and service brake activation frequency, duration and/or pressure. For example, the transmission control circuit 62 may be operable to continually monitor and learn the current desired road speed over a recent time interval, and to determine that the learned road speed is the desired road speed if the vehicle acceleration exceeds an acceleration threshold with the service brake applied. As another example, the transmission control circuit 62 may be operable at step 102 to determine the desired vehicle speed by continually monitoring the vehicle road speed, and to calculate, e.g., via one or more equations, tables, graphs, charts or the like, a desired road speed as a function of the current road speed, acceleration of the vehicle over a specified time period and a duration of this time period that the service brake was depressed. Those skilled in the art will recognize other techniques for determining the desired road speed of the vehicle based on information provided by one or more sensors, switched and/or systems when the cruise control unit 46 is not active or is not otherwise producing a desired road speed value, and any such other techniques are contemplated by this disclosure.

From step 102, the process 100 advances to step 104 where the transmission control circuit 62 is operable to determine the current vehicle road speed, VRS. Illustratively, the transmission control circuit 62 is operable to determine the current vehicle road speed, VRS, by monitoring the speed signal produced by the transmission output shaft speed sensor 68 and processing this signal in a conventional manner to determine the current vehicle road speed. Alternatively or additionally, the system 10 may include one or more other speed sensors that are suitably positioned relative to the vehicle and that produce a speed signal that the transmission control circuit 62 may use to determine the current vehicle road speed, VRS.

Following step 104, the process 100 advances to step 106 where the transmission control circuit 62 is operable to determine whether the current vehicle road speed, VRS, less the desired vehicle speed, DVS, is greater than a speed threshold value, $S_{TH}$. Generally, $S_{TH}$ will be set to a value above which a vehicle overspeed condition is considered to exist, e.g., 5 mph or other suitable value.

If, at step 106, the transmission control circuit 62 determines that the current vehicle road speed, VRS, less the desired vehicle speed, DVS, is greater than the speed threshold value, $S_{TH}$, the process 100 advances to step 108 where the transmission control circuit 62 is operable to determine a brake torque value, BT, that would have to be applied to the engine 12 to reduce VRS to DVS. In one embodiment, the memory 65 has one or more graphs, charts, tables, one or more equations or models or the like stored therein that maps pairs of values of VRS and DVS to corresponding brake torque values, BT. It will be understood that step 108 may alternatively or additionally include more or fewer parameters from which to determine the brake torque values, BT, and any such more or fewer parameters are contemplated by this disclosure. Examples of one or more additional or alternative parameters that may be used to determine the brake torque values, BT, may include, but are not limited to, engine speed, e.g., using signals produced by the transmission input shaft speed sensor 64, engine output torque, e.g., sent to the transmission control circuit 62 by the engine control circuit 40 in the form of one or more messages broadcast on the data link 72, or the like. In an alternate embodiment, the transmission control circuit 62 includes a controller that determines determining a speed error as a difference between the road speed of the vehicle, VRS, and the desired speed of the vehicle, DVS, and that then determines the target brake value based on the speed error in a conventional manner by controls the brake torque value, BT, to a value that minimizes the speed error. In one embodiment, such a controller may be implemented as a conventional proportional-integral (PI) controller, although other conventional controller configurations may alternatively be used.

The process 100 advances from step 108 to step 110 where the transmission control circuit 62 is operable to determine a maximum available brake torque value, MBT. In one embodiment, the engine control circuit 40 is operable to continually compute the maximum available brake torque value in a conventional manner, e.g., based on a number of engine operating conditions, and to continually send the computed maximum available brake torque value to the transmission control circuit 62 via the data link 72, e.g., in the form of one or more messages broadcast by the engine control circuit 40 onto the data link 72. In this embodiment, the transmission control circuit 62 is operable to determine the maximum available brake torque value, MBT, at step 110 by monitoring the communication port, COM, and receiving the maximum available brake torque values sent by the engine control circuit 40. In alternative embodiments, the engine control circuit 40 may send information to the transmission control circuit 62, e.g., via the data link 72, from which the maximum available brake torque, MBT, may be determined. In this embodiment, the transmission control circuit 62 is operable at step 110 to determine the maximum available brake torque value, MBT, by receiving information from the engine control circuit 40 and computing MBT based on the received information.

Following step 110, the process 100 advances to step 112 where the transmission control circuit 62 is operable to determine a target brake torque value, TBT, as a minimum of the brake torque value, BT, determined at step 108 and the maximum available brake torque value, MBT, determined at step 110.

If, at step 106, the transmission control circuit 62 determines that the vehicle road speed, VRS, less the desired vehicle speed, DVS, is not greater than the speed threshold, $S_{TH}$, the process 100 advances to step 116 where the target brake torque value, TBT, is ramped to zero. The ramp rate of TBT at step 116 may be predetermined or may be determined as a function of one or more system operating parameters. In any case, the process 100 advances from step 112 and from step 116 to step 114 where the one or more exhaust brake devices described herein are controlled based on the target brake torque value, TBT, to apply a corresponding target brake torque to the engine 12 and thereby control the road speed, VRS, of the vehicle to the desired vehicle speed, DVS.

Figure 3:
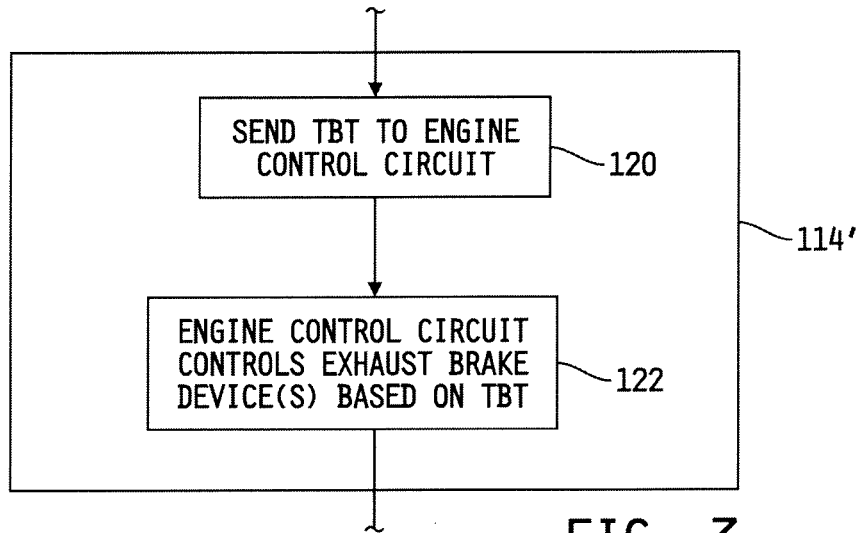
FIG. 3 is a flowchart of one illustrative embodiment of a process for carrying out the last step of the process illustrated in FIG. 2.

Referring now to FIG. 3, a flowchart is shown of one illustrative embodiment 114' of step 114 of the process 100 illustrated in FIG. 1. In the illustrated embodiment, step 114' includes a first step 120 in which the transmission control circuit 62 is operable to send the target brake torque, TBT, to the engine control circuit 40 via the data link 72. The engine control circuit 72 is operable thereafter at step 122 to control the one or more exhaust brake devices, e.g., the variable geometry turbocharger 22 via the VGT output and/or the exhaust throttle 38 via the EXT output, to apply a target brake torque corresponding to TBT to the engine 12 and thereby control the road speed, VRS, of the vehicle to the desired vehicle speed, DV.

Figure 4:
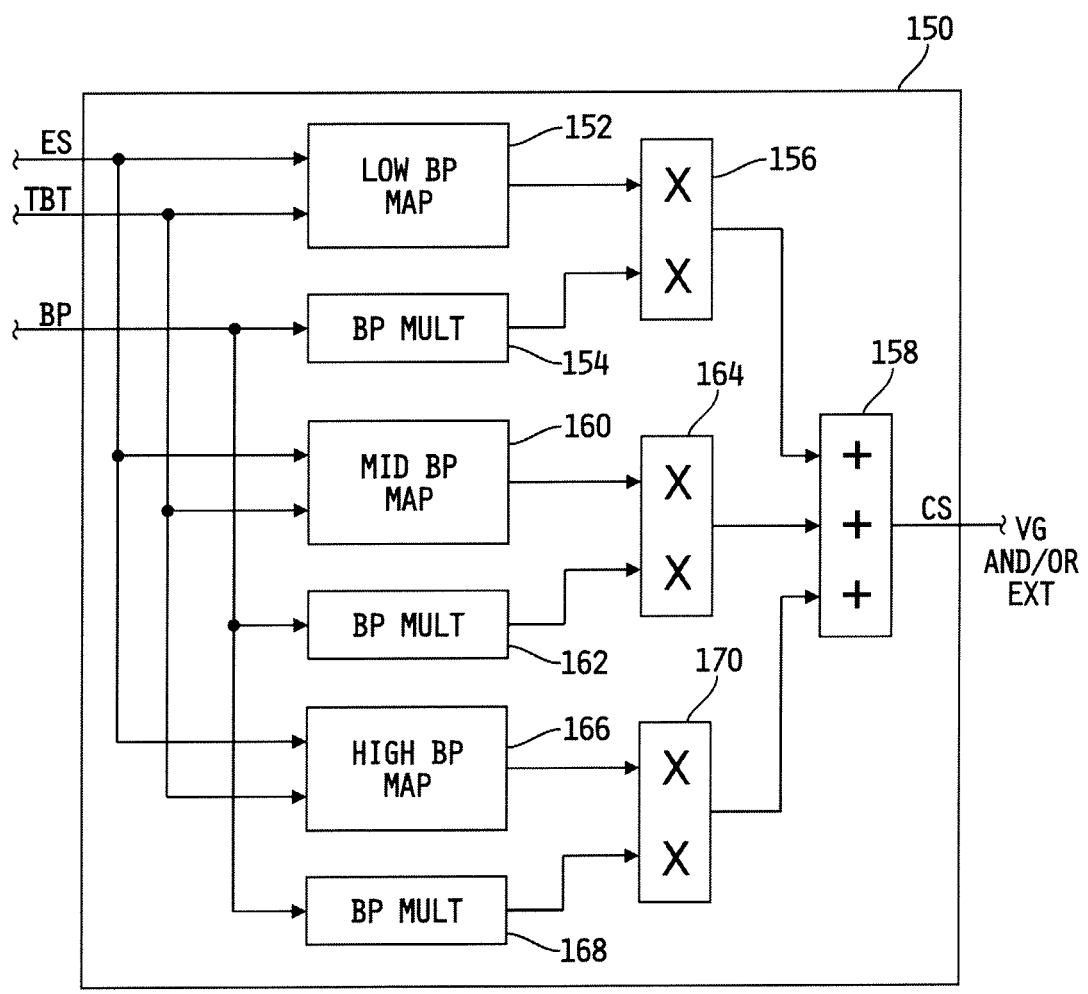
FIG. 4 is a logic diagram of one illustrative embodiment of a process for determining control setting(s) for the one or more exhaust brake devices.

Referring now to FIG. 4, a logic diagram is shown of one illustrative embodiment of a control algorithm 150 that may be used by the engine control circuit 140 at step 122 to control the one or more exhaust brake devices to apply a brake torque corresponding to TBT to the engine 12. In the illustrated embodiment, the control algorithm includes a low barometric pressure map 152 having inputs receiving an engine speed value that was determined by the engine control circuit 40 from the engine speed signal, ES, and the target brake torque value, TBT, received from the transmission control circuit 62. The engine speed value and the target brake torque value, TBT, are likewise each applied as inputs to a mid barometric pressure map 160 and a high barometric pressure map 168. Outputs of the maps 152, 160 and 166 are each provided as one input to a different multiplication block 156, 164 and 170 respectively. The control algorithm 150 further includes three separate barometric pressure multiplier blocks 154, 162 and 168, the outputs of which are each provided as another input to the different multiplication blocks 156, 164 and 170 respectively. Outputs of the three multiplication blocks 156, 164 and 170 are all provided as inputs to a single summation block 158, the output of which is a control signal, CS, that may be used to control either or both of the exhaust brake devices.

The low barometric pressure map 152 illustratively produces an exhaust brake actuation signal, calibrated for low barometric pressure values, as a function of ES and TBT, and the barometric pressure multiplier block produces a multiplier value, e.g., between 0 and 1, depending upon the value of the barometric pressure signal, BP, relative to a predefined low barometric pressure value or range. For example, if the barometric pressure is relatively low, the barometric pressure multiplier value produced by the block 154 will be relatively high, whereas the barometric pressure multiplier value produced by the block 154 will be relatively low if the barometric pressure value, BP, is relatively high. The remaining blocks 160, 162 and 166, 168 function similarly so that the actuator value produced by the summation block 158 is a blend of actuator values for the current barometric pressure value, BT, relative to three different predetermined barometric pressure levels or ranges. In embodiments in which VGT is used as the only exhaust brake control mechanism, the control signal, CS, will typically be in the form of a turbine vane position or similar signal. In embodiments in which EXT is used as the only exhaust brake control mechanism, the control signal, CS, will typically be in the form of a throttle position relative to a zero or maximum throttle position. In embodiments in which VGT and EXT are both used as exhaust brake control mechanisms, the control algorithm 150 may include two separate control structures of the type just described, or may alternatively include a conventional control structure that blends operation of the variable geometry turbocharger 22 and exhaust throttle 38 or that arbitrates control between the two devices.

Figure 5:
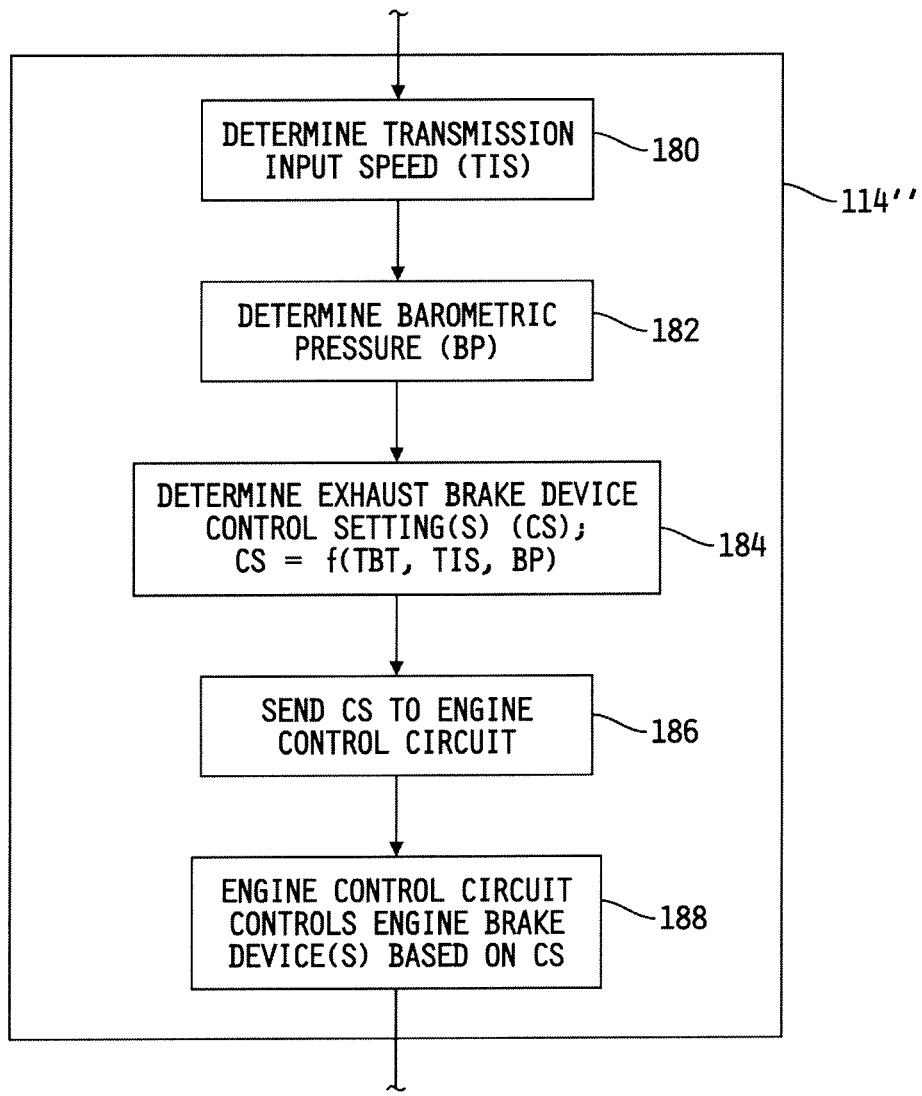
FIG. 5 is a flowchart of another illustrative embodiment of a process for carrying out the last step of the process illustrated in FIG. 2.

Referring now to FIG. 5, a flowchart is shown of another illustrative embodiment 114" of step 114 of the process 100 illustrated in FIG. 1. In the illustrated embodiment, the transmission control circuit 62 is operable to determine the control signal, CS, and to provide the control signal, CS, to the engine control circuit 40 for direct control of the one or more exhaust brake devices. In this embodiment, step 114" includes a first step 180 in which the transmission control circuit 62 is operable to determine the transmission input shaft speed, TIS, by monitoring and processing the speed signal produced by the transmission input shaft speed sensor 64. Because the transmission input shaft is driven directly by the engine, TIS generally represents the rotational speed, ES, of the engine 12. Thereafter at step 182, the transmission control circuit 162 is operable to determine the barometric pressure, BP. In the embodiment illustrated in FIG. 1, the transmission control circuit 62 is illustratively configured to carry out step 182 by receiving the barometric pressure value, BP, from the engine control circuit 40 via the data link 72, e.g., in the form of messages broadcast by the engine control circuit 40 on the data link 72. In alternative embodiments, such as shown by dashed line representation in FIG. 1, the transmission control circuit 62 may have an input that is electrically connected to an output of the barometric pressure sensor 54, and in this embodiment the transmission control circuit 62 is operable to carry out step 182 by monitoring and processing the pressure signal produced by the barometric pressure sensor 54.

Step 182 advances to step 184 where the transmission control circuit 62 is operable to determine the exhaust brake device control signal or settings, CS, as a function of the target brake torque value, TBT, the transmission input shaft speed, TIS, and the barometric pressure value, BP. In one embodiment, the control algorithm 150 illustrated in FIG. 5 is implemented in the memory unit 65 of the transmission control circuit 62 and the transmission control circuit 62 is operable at step 184 to determine the control signal or settings, CS, as described with respect to the control algorithm 150 of FIG. 5. Alternatively, the memory unit 65 of the transmission control circuit 62 may include one or more conventional algorithms for determining CS as a function of at least TBT. In any case, step 184 advances to step 186 where the transmission control circuit 62 is operable to send the control signal or settings, CS, to the engine control circuit 40, e.g., via the data link 72 in the form of one or more messages broadcast by the transmission control circuit 62 on the data link 72. Thereafter at step 188, the engine control circuit is operable to control the one or more engine brake devices based on the control signal or settings, CS, received from the transmission control circuit 62.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An engine control circuit for a vehicle, the vehicle including one or more exhaust brake devices operable to apply a braking force to an engine of the vehicle, the engine control circuit including a memory device having instructions stored therein that, when executed cause the engine control circuit to:
   receive a target brake torque from a transmission control circuit, the transmission control circuit configured to (i) control operation of a transmission of the vehicle and (ii) send the target brake torque to the engine control circuit in response to detecting that a current road speed of the vehicle exceeds a desired speed of the vehicle by a predetermined threshold,
   receive a speed signal indicative of the speed of the engine from a speed sensor,
   receive a barometric pressure signal indicative of the current barometric pressure from a barometric pressure sensor,
   determine a control setting of the one or more exhaust brake devices based on the target brake torque, the speed signal, and the barometric pressure signal, and
   control the one or more exhaust brake devices based on the control setting.

2. The engine control circuit of claim 1, wherein the one or more exhaust brake devices comprises a variable geometry turbocharger having a number of positionable vanes.

3. The engine control circuit of claim 2, wherein the control setting is a target vane position, and wherein the plurality of instructions, when executed, further cause the engine control circuit to control the vanes of the variable geometry turbocharger based on the target vane position.

4. The engine control circuit of claim 1, wherein the one or more exhaust brake devices comprises an exhaust throttle configured to restrict exhaust gas flow therethrough.

5. The engine control circuit of claim 4, wherein the control setting is a target exhaust throttle position, and wherein the plurality of instructions, when executed, further cause the engine control circuit to control the exhaust throttle based on the target exhaust throttle position.

6. The engine control circuit of claim 1, wherein the one or more exhaust brake devices comprises a variable geometry turbocharger having a number of positionable vanes and an exhaust throttle configured to restrict exhaust gas flow therethrough.

7. The engine control circuit of claim 1, wherein the engine control circuit receives the target brake torque from the transmission control circuit via a datalink connected between the engine control circuit and the transmission control circuit.

8. The engine control circuit of claim 7, wherein the plurality of instructions, when executed, further cause the engine control circuit to send to the transmission control circuit via the datalink a maximum available brake torque value corresponding to a maximum available brake torque that may be currently applied to the engine, and wherein the transmission control circuit is configured to determine the target brake torque value based on the maximum available brake torque prior to sending the target brake torque value to the engine control circuit.

9. The engine control circuit of claim 1, wherein to determine the control setting of the one or more exhaust brake devices based on the target brake torque, the speed signal, and the barometric pressure signal comprises to determine the control setting based on a first predetermined barometric pressure range, a second predetermined barometric pressure range, and a third predetermined barometric pressure range.

10. The engine control circuit of claim 9, wherein the first predetermined barometric pressure range is a low barometric pressure range, the second predetermined barometric pressure range is a middle barometric pressure range, and the third predetermined barometric pressure range is a high barometric pressure range.

11. A system for controlling overspeeding of a vehicle carrying an engine and a transmission, the system comprising:
an exhaust brake device responsive to a control signal to apply braking torque to the engine, and
an engine control circuit configured to (i) receive a target brake torque value from a transmission control circuit configured to control operation of the transmission and (ii) control operation of the engine by applying the target brake torque to the engine,
wherein the engine control circuit receives the target brake torque value from the transmission control circuit in response to the transmission control circuit detecting a vehicle overspeed condition.

12. The system of claim 11, wherein the transmission control circuit detects the vehicle overspeed condition if the difference between a desired speed of the vehicle and a road speed of the vehicle different than the desired speed of the vehicle exceeds a predetermined threshold.

13. The system of claim 12, wherein the engine control circuit controls operation of the engine by applying the target brake torque to the engine to control the road speed of the vehicle to the desired speed of the vehicle.

14. The system of claim 11, comprising:
an engine speed sensor configured to produce an engine speed signal indicative of rotational speed of the engine, and
a barometric pressure sensor configured to produce a pressure signal indicative of current barometric pressure,
wherein the engine control circuit is configured to produce the control signal based on the engine speed signal, the pressure signal, and the target brake torque value.

15. The system of claim 14, wherein the engine control circuit is configured to produce the control signal based on a first predetermined barometric pressure range, a second predetermined barometric pressure range, and a third predetermined barometric pressure range.

16. The system of claim 15, wherein the first predetermined barometric pressure range is a low barometric pressure range, the second predetermined barometric pressure range is a middle barometric pressure range, and the third predetermined barometric pressure range is a high barometric pressure range.

17. The system of claim 11, wherein (i) the exhaust brake device is a variable geometry turbocharger having a number of positionable vanes, (ii) the control signal is a target vane position, and (iii) the engine control circuit is configured to control the vanes of the variable geometry turbocharger based on the target vane position.

18. The system of claim 11, wherein (i) the exhaust brake device is an exhaust throttle configured to restrict exhaust gas flow therethrough, (ii) the control signal is a target exhaust throttle position, and (iii) the engine control circuit is configured to control the exhaust throttle based on the target exhaust throttle position.

19. The system of claim 11, wherein the engine control circuit receives the target brake torque from the transmission control circuit via a datalink connected between the engine control circuit and the transmission control circuit.

20. The system of claim 19, wherein the engine control circuit is configured to send to the transmission control circuit via the datalink a maximum available brake torque value corresponding to a maximum available brake torque that may be currently applied to the engine, and wherein the transmission control circuit determines the target brake torque value based on the maximum available brake torque prior to sending the target brake torque value to the engine control circuit.

* * * * *